US009338713B2

United States Patent
Chakravarthy et al.

(10) Patent No.: US 9,338,713 B2
(45) Date of Patent: May 10, 2016

(54) APPARATUS AND METHOD FOR ENHANCED TUNE-AWAY OPERATION

(71) Applicant: QUALCOMM Incorporated, San Diego, CA (US)

(72) Inventors: Chetan Gopalakrishnan Chakravarthy, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 14/255,207

(22) Filed: Apr. 17, 2014

(65) Prior Publication Data

US 2015/0098445 A1   Apr. 9, 2015

Related U.S. Application Data

(60) Provisional application No. 61/886,579, filed on Oct. 3, 2013.

(51) Int. Cl.
*H04W 80/04* (2009.01)
*H04W 36/14* (2009.01)
*H04W 88/06* (2009.01)
*H04W 76/02* (2009.01)
*H04W 8/18* (2009.01)
(Continued)

(52) U.S. Cl.
CPC .............. *H04W 36/14* (2013.01); *H04W 8/183* (2013.01); *H04W 76/025* (2013.01); *H04W 88/06* (2013.01); *H04W 60/005* (2013.01); *H04W 68/005* (2013.01)

(58) Field of Classification Search
CPC ...... H04W 80/04; H04W 36/18; H04W 68/00; H04W 36/30; H04W 36/08; H04W 72/04; H04W 88/06
See application file for complete search history.

(56) References Cited

U.S. PATENT DOCUMENTS 6,934,391 B1 * 8/2005 Linkola ............... H04L 63/0853
380/247
2002/0082020 A1 * 6/2002 Lee .................... H04W 72/1289
455/450

(Continued)

FOREIGN PATENT DOCUMENTS

EP            2605561 A1    6/2013
WO   WO-2013035065 A1    3/2013
WO   WO-2013110284 A1    8/2013

OTHER PUBLICATIONS

International Search Report and Written Opinion—PCT/US2014/058878—ISA/EPO—Feb. 12, 2015.

*Primary Examiner* — Andrew Lee
(74) *Attorney, Agent, or Firm* — Loza & Loza LLP

(57) ABSTRACT

Apparatus and methods are disclosed for a multi-SIM/multi-standby wireless user equipment (UE) configured for tune-away operations enabling simultaneous communication on multiple subscriptions using a shared RF chain while maintaining an ongoing signaling procedure on a primary subscription. The UE performs a signaling procedure with a first network associated with a first subscription, and decodes a downlink channel of the first network during an initial period of a transmission time interval (TTI). If the decoded downlink channel indicates that no data of the first subscription is destined to the UE during the current TTI, the UE tunes away to a second subscription to receive data from a second network associated with the second subscription.

30 Claims, 11 Drawing Sheets

(51) Int. Cl.
*H04W 60/00* (2009.01)
*H04W 68/00* (2009.01)

(56) References Cited

U.S. PATENT DOCUMENTS

| | | | | |
|---|---|---|---|---|
| 2003/0148791 A1* | 8/2003 | Ahn | ...................... | H04W 8/183 455/559 |
| 2012/0176908 A1 | 7/2012 | Lee | | |
| 2013/0005334 A1* | 1/2013 | Liang | ...................... | H04M 3/38 455/432.3 |
| 2013/0064180 A1* | 3/2013 | Bergman | .............. | H04L 1/1854 370/328 |
| 2013/0094451 A1* | 4/2013 | Pavlovski | ............... | H04W 8/26 370/329 |
| 2013/0148574 A1* | 6/2013 | Liu | ....................... | H04W 36/08 370/328 |
| 2013/0165077 A1* | 6/2013 | Aalla | .................... | H04W 12/12 455/411 |
| 2013/0237197 A1 | 9/2013 | Ruvalcaba et al. | | |
| 2013/0260761 A1 | 10/2013 | Walke et al. | | |
| 2013/0303181 A1 | 11/2013 | Rajurkar et al. | | |
| 2013/0303240 A1 | 11/2013 | Sanka et al. | | |
| 2013/0326319 A1 | 12/2013 | Chung et al. | | |
| 2014/0146957 A1* | 5/2014 | Thange | ................ | H04M 3/4228 379/221.14 |
| 2014/0228070 A1* | 8/2014 | Josso | ................... | H04W 68/00 455/552.1 |
| 2015/0056998 A1* | 2/2015 | Kaikkonen | ........... | H04W 36/30 455/436 |

* cited by examiner

APPARATUS AND METHOD FOR ENHANCED TUNE-AWAY OPERATION

CROSS-REFERENCE TO RELATED APPLICATION

This application claims priority to and the benefit of provisional patent application No. 61/886,579 filed in the United States Patent and Trademark Office on 3 Oct. 2013, the entire content of which is incorporated herein by reference.

TECHNICAL FIELD

Aspects of the present disclosure relate generally to wireless communication systems, and more particularly, to a mobile station equipped to operate with at least two subscriptions and methods of operating the same.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

Generally, wireless user equipment (e.g., referred to as mobile station (MS), mobile terminal (MT), access terminal (AT), etc. in various literature) configured for UMTS uses a Universal Integrated Circuit Card (UICC) (generally referred to as a SIM card) to store subscriber identity and for other security and authentication purposes. More recently, some UEs have multiple UICCs or SIM cards such that the user of the device can engage in calls or data communication on two or more different subscriptions. In general, each subscription is specified by a set of services and an identity associated with a network (e.g., UMTS). These subscriptions might be on the same network or different networks. A UE with multiple SIM cards is generally referred to as a multi-SIM device. Some such multi-SIM devices utilize a radio frequency (RF) resource (e.g., modem, transceiver), which is shared for accessing multiple subscriptions. However, there are certain limitations on carrying communications concurrently or simultaneously on multiple subscriptions while sharing the same RF resource.

As the demand for mobile broadband access continues to increase, research and development continue to advance multi-SIM wireless technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to a mobile station or user equipment equipped to operate with at least two subscriptions and an improved method of tuning away from a primary subscription to a secondary subscription.

One aspect of the disclosure provides for a method of wireless communication operable at a user equipment (UE) configured to communicate with a first subscription and a second subscription. The UE performs a signaling procedure with a first network associated with the first subscription. The UE decodes a downlink channel of the first network during an initial period of a transmission time interval (TTI). If the decoded downlink channel indicates that no data of the first subscription is destined to the UE during the current TTI, the UE tunes away to the second subscription to receive data from a second network associated with the second subscription.

Another aspect of the disclosure provides for a user equipment (UE) configured to communicate with a first subscription and a second subscription. The UE includes means for performing a signaling procedure with a first network associated with the first subscription and means for decoding a downlink channel of the first network during an initial period of a transmission time interval (TTI). The UE further includes means for if the decoded downlink channel indicates that no data of the first subscription is destined to the UE during the current TTI, tuning away to the second subscription to receive data from a second network associated with the second subscription.

Another aspect of the disclosure provides for a computer-readable medium including code configured to cause a user equipment (UE) to perform various functions. The UE performs a signaling procedure with a first network associated with the first subscription and decodes a downlink channel of the first network during an initial period of a transmission time interval (TTI). If the decoded downlink channel indicates that no data of the first subscription is destined to the UE during the current TTI, the UE tunes away to the second subscription to receive data from a second network associated with the second subscription.

Another aspect of the disclosure provides for a user equipment (UE) including at least one processor, a communication interface coupled to the at least one processor, and a memory coupled to the at least one processor. The at least one processor includes a number components including: perform a signaling procedure with a first network associated with the first subscription; decode a downlink channel of the first network during an initial period of a transmission time interval (TTI); and if the decoded downlink channel indicates that no data of the first subscription is destined to the UE during the current TTI, tune away to the second subscription to receive data from a second network associated with the second subscription.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Aspects of the present disclosure improve tune-away operation in multi-SIM/multi-standby mobile devices. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

One or more aspects of the disclosure provide for a wireless user equipment (UE) configured to enable communication with two or more subscriptions simultaneously using a tuning away operation, wherein each subscription may be in the same or in different radio access technologies (RAT). The UE may be a multi-SIM device that has multiple USIM applications stored on one or more Universal Integrated Circuit Cards (UICC) (generally referred to as a smart card or SIM card). In some aspects of the disclosure, however, the USIM applications may be stored at the UE without using any UICC (e.g., soft SIM models).

Figure 1:
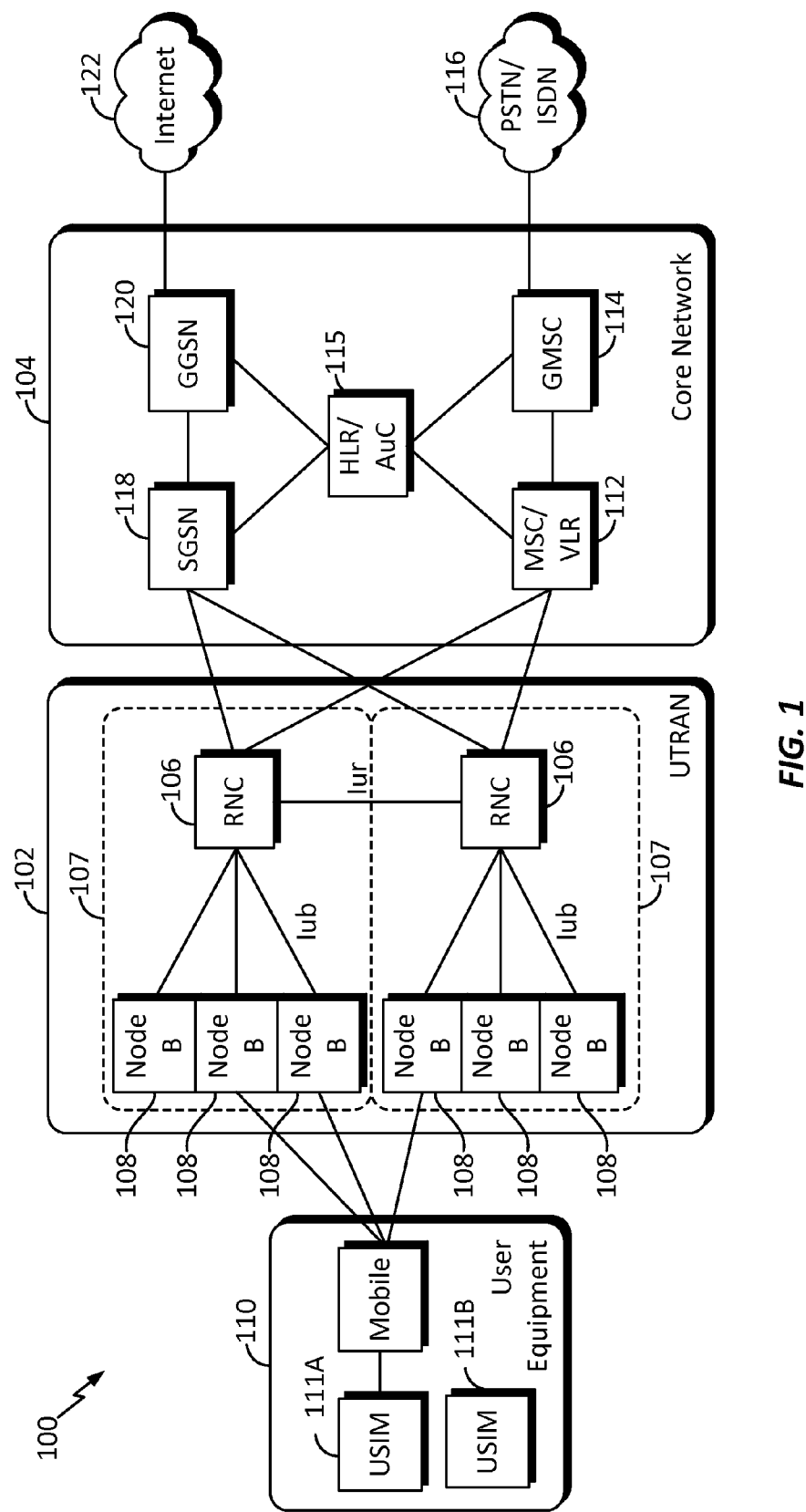
FIG. 1 is a block diagram conceptually illustrating an example of a telecommunications system according to some aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) network 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111 (111A and 111B), which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks such as cdma2000 and Long Term Evolution (LTE) networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

In some aspects of the disclosure, the UE 110 may include a plurality of universal integrated circuit cards (UICCs), each of which may run one or more universal subscriber identity module (USIM) applications. Throughout this specification, the term "SIM" may generally refer to the UICC and/or the USIM. A USIM stores the subscriber's identity, and provides a user's subscription information to a network as well as performing other security and authentication roles. The illustrated UE 110 includes two USIMs 111A and 111B, but those of ordinary skill in the art will understand that this is illustrative in nature only, and a UE may include any suitable number of USIMs. UEs such as the UE 110 having multiple USIMs are sometimes referred to as multi-SIM devices, with one particular example with two USIMs being called Dual SIM Dual Standby (DSDS) device or dual-SIM device. A DSDS device is generally capable of being active on two networks (or subscriptions) concurrently or simultaneously in standby mode, where an RF resource (e.g., transceiver) at the UE 110 is time-shared by two subscriptions on the respective networks. In this way, connections or calls may be established on either of the networks or subscriptions with a single device.

As described above, the illustrated UE 110 is an example of a DSDS device capable of maintaining two subscriptions on the UMTS network 100 and or other networks. Within the scope of the present disclosure, similar functionality may be achieved utilizing more than one radio access technology (RAT), wherein the UE simultaneously maintains two or more subscriptions on two or more different RATs. For example, in various aspects of the disclosure, a UE may maintain one or more subscriptions on one or more of a GSM network, a UMTS network, an LTE network, a cdma2000 network, a Wi-MAX network, or any other suitable RAT. Within the present disclosure, DSDS devices, multi-SIM/multi-standby devices, or any device capable of monitoring channels on two or more subscriptions on any one or any plural number of RATs is generally referred to as a multi-standby device.

On a multi-standby UE 110, certain compromises are typical to allow time sharing of the same RF resource (e.g., radio transceiver) between two or more separate user subscriptions. That is, the UE 110 generally cannot be guaranteed to be listening to all of the required radio channels for each subscription at the same time, and thus, may miss paging messages on one subscription when engaged in a communication activity utilizing the other subscription. Most cellular network implementations allow for broadcast information (such as paging) to be repeated a finite number of times over multiple cycles, but do not provide any mechanism for the subscriber devices to know what this repetition pattern might be. Thus, there remains a possibility that such broadcast information might be missed by a UE engaged in a communication activity utilizing a different subscription or channel.

Figure 2:
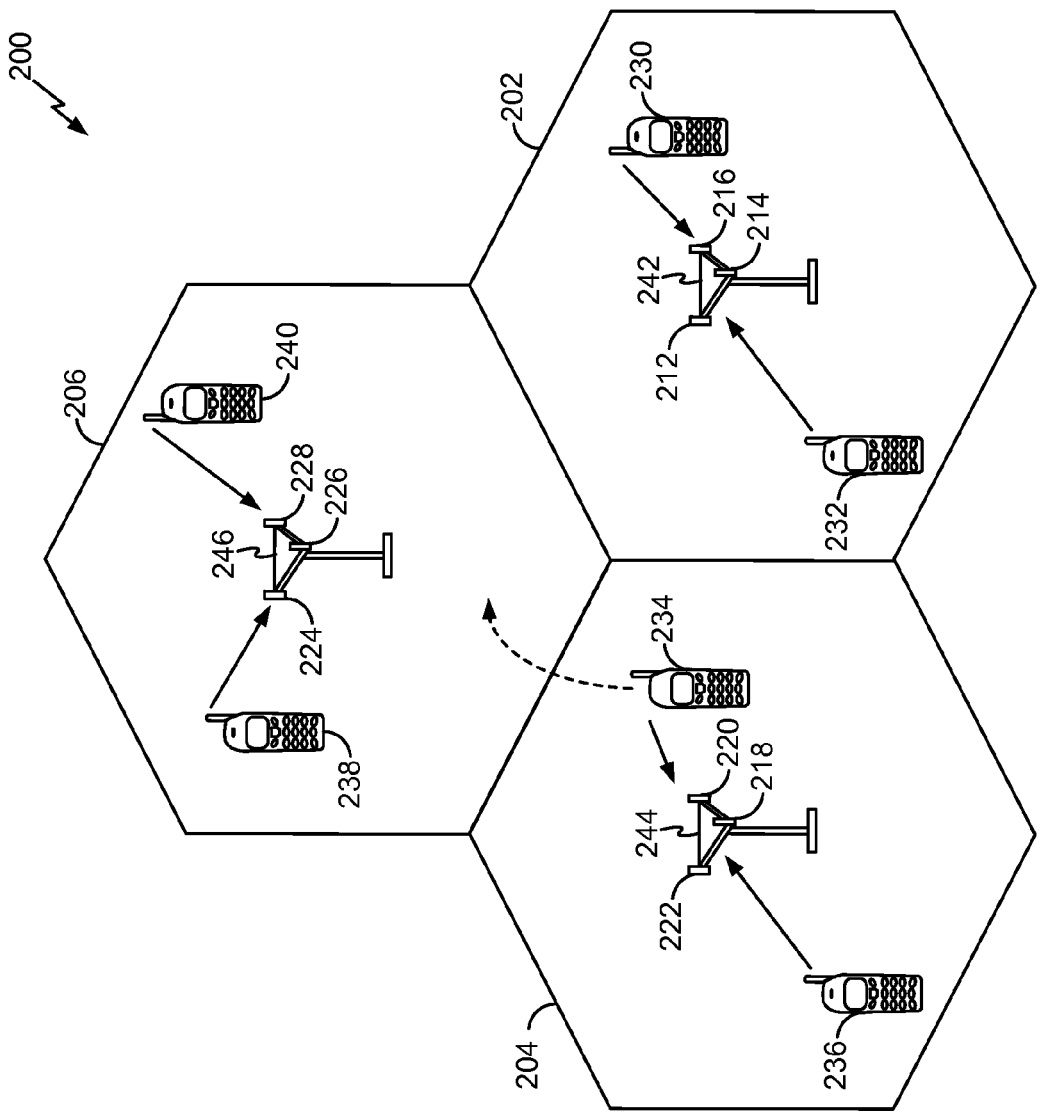
FIG. 2 is a conceptual diagram illustrating an example of an access network according to some aspects of the disclosure.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, a first cell may utilize a first scrambling code, and a second cell, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104 (see FIG. 1) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set). In some aspects of the disclosure, any of the UEs in FIG. 2 may be a multi-SIM device or DSDS device supporting multiple subscriptions.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
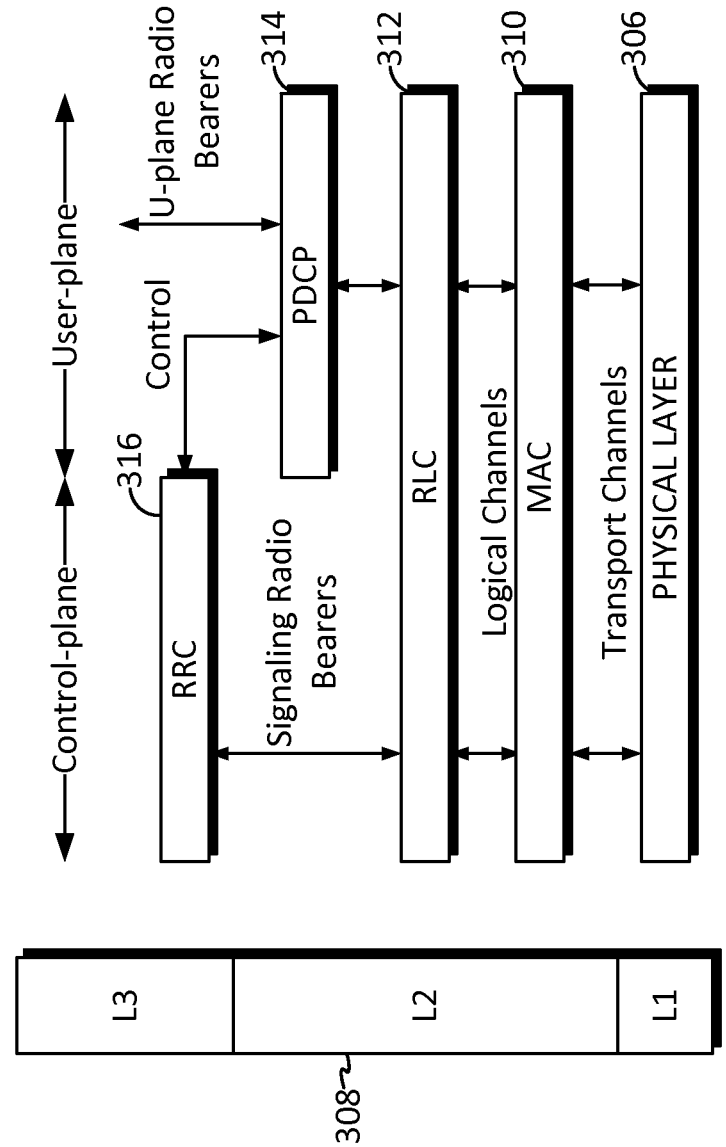
FIG. 3 is a conceptual diagram illustrating an example of a radio protocol architecture for the user and control plane.

Turning to FIG. 3, the AS is shown with three layers: Layer 1 (L1), Layer 2 (L2), and Layer 3 (L3). Layer 1 is the lowest layer and implements various physical layer signal processing functions. Layer 1 will be referred to herein as the physical layer 306. The data link layer, called Layer 2 308, is above the physical layer 306 and is responsible for the link between the UE and Node B over the physical layer 306.

At Layer 3, the radio resource control (RRC) layer 316 handles the control plane signaling between the UE and the Node B. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
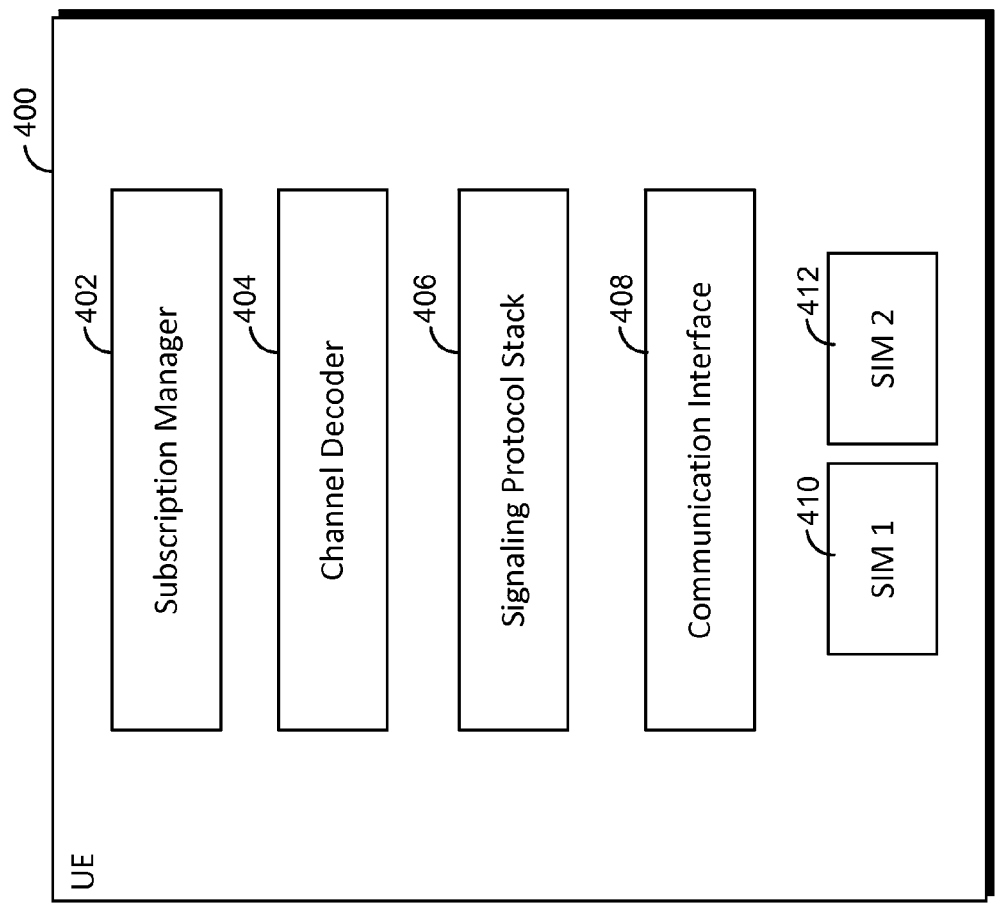
FIG. 4 is a conceptual diagram illustrating a user equipment (UE) configured for multi-SIM/multi-standby operation in accordance with an aspect of the disclosure.

FIG. 4 is a conceptual block diagram illustrating a UE 400 configured for multi-SIM/multi-standby operation in accordance with an aspect of the disclosure. In an aspect of the disclosure, the UE 400 may be any of the UEs illustrated in FIGS. 1 and/or 2, which may be configured to communicate with two or more subscriptions (e.g., a primary subscription and a secondary subscription of FIG. 6). The UE 400 has a subscription manager 402, a channel decoder 404, a signaling protocol stack 406, a communication interface 408, a first SIM (SIM1) 410 and a second SIM (SIM2) 412. These components of FIG. 4 may be implemented in software, hardware, firmware, or a combination thereof. The subscription manager 402 manages the subscriptions that the UE 400 may communicate with under various conditions. For example, the UE 400 may operate with a primary subscription and a secondary subscription in a DSDS operation, the subscription manager 402 may control the tune-away operation between the subscriptions. The channel decoder 404 may decode various channels from the primary subscription or secondary subscription. For example, the channel decoder 404 may decode a downlink Dedicated Physical Channel (DPCH) that carries signaling messages from the network. The signaling protocol stack 406 may be the same as the signaling protocol stack shown in FIG. 3 and adapted to support communication with more than one subscriptions.

The communication interface 408 provides a means for communicating with various other apparatus over a transmission medium. In an aspect of the disclosure, the UE 400 includes two SIMs 410 and 412, associated with different subscriptions or networks. For example, the SIMs 410 and 412 may be the same as the UICCs 111A and 111B of FIG. 1. The UE 400 may use the communication interface 408 to access the different subscriptions associated with the SIMs 410 and 412. In some aspects of the disclosure, the communication interface 408 may include a transceiver that is time-shared by the subscriptions in an improved tune-away scheme, which will be described in detail below in relation to FIGS. 6-11.

Figure 5:
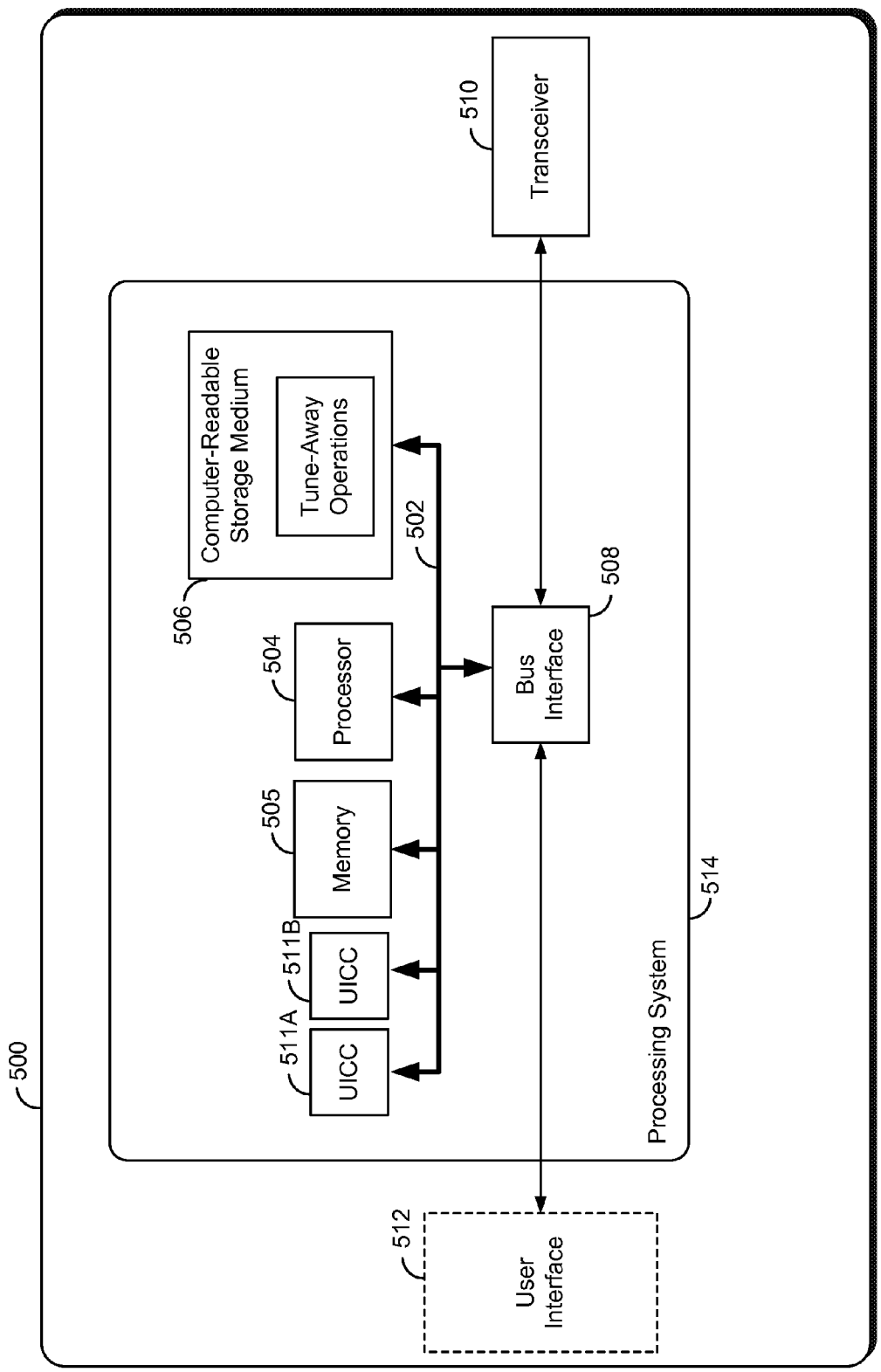
FIG. 5 is a block diagram illustrating an example of a hardware implementation for a user equipment employing a processing system according to some aspects of the disclosure.

FIG. 5 is a block diagram illustrating an example of a hardware implementation for an apparatus 500 employing a processing system 514. In accordance with various aspects of the disclosure, an element, or any portion of an element, or any combination of elements may be implemented with a processing system 514 that includes one or more processors 504. For example, any of the UEs in FIG. 1, 2 or 4 may be implemented with the apparatus 500. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure in relation to FIGS. 6-11.

In some aspects of the disclosure, blocks 402 to 408 of FIG. 4 may be implemented by the processor 504 and/or transceiver 510 of FIG. 5. Also, SIMs 410 and 412 may be the same as the UICC 511A and 511B of FIG. 5. In some aspects of the disclosure, the radio protocol architecture of FIG. 3 or signaling protocol stack of 406 may be implemented by the processor 504 and/or memory 505 of FIG. 5.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits or components including one or more processors (represented generally by the processor 504), a memory 505, computer-readable media (represented generally by the computer-readable medium 506), and one or more UICCs 511A and 511B. Each of the UICCs may contain one or more USIM applications. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. The transceiver 510 may be used to access one or more subscriptions respectively associated with the UICCs 511A and 511B.

In some examples of a DSDS device such as the illustrated UE 110 or UE 400 including two USIMs, even though the USIMs may be utilized by different subscriptions or networks, the subscriptions may share a RF resource such as a single transceiver 510. However, while the examples detailed herein relate to UEs that utilize a single transceiver 510 and methods for performing the below-described tune-away procedure utilizing that single transceiver, the broad concepts described herein may also be applicable to devices having two or more transceivers 510.

Depending upon the nature of the apparatus, a user interface 512 (e.g., keypad, display, speaker, microphone, joystick, a touchscreen, a touchpad) may also be provided. The processor 504 is responsible for managing the bus 502 and general processing, including the execution of software stored on the computer-readable medium 506. The software (e.g., a tune-away operations software), when executed by the processor 504, causes the processing system 514 to perform the various functionalities described in relation to FIGS. 6-11 for any particular apparatus. The computer-readable medium 506 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. In an aspect of the disclosure, the software may include improved tune-away operations, which will be described in detail below. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In various aspects of the disclosure, a UE may simultaneously or concurrently perform two different communication activities, including but not limited to connecting with two different networks, or two different subscriptions within the same network, or two cells in a cellular network. Particularly, the UE may be enabled to continue to be engaged in ongoing communication activities on one subscription, while simultaneously or concurrently performing other communication activities on another subscription, such as receiving paging messages, performing SMS messaging, or receiving other information on a different subscription or from a different cell.

Figure 6:
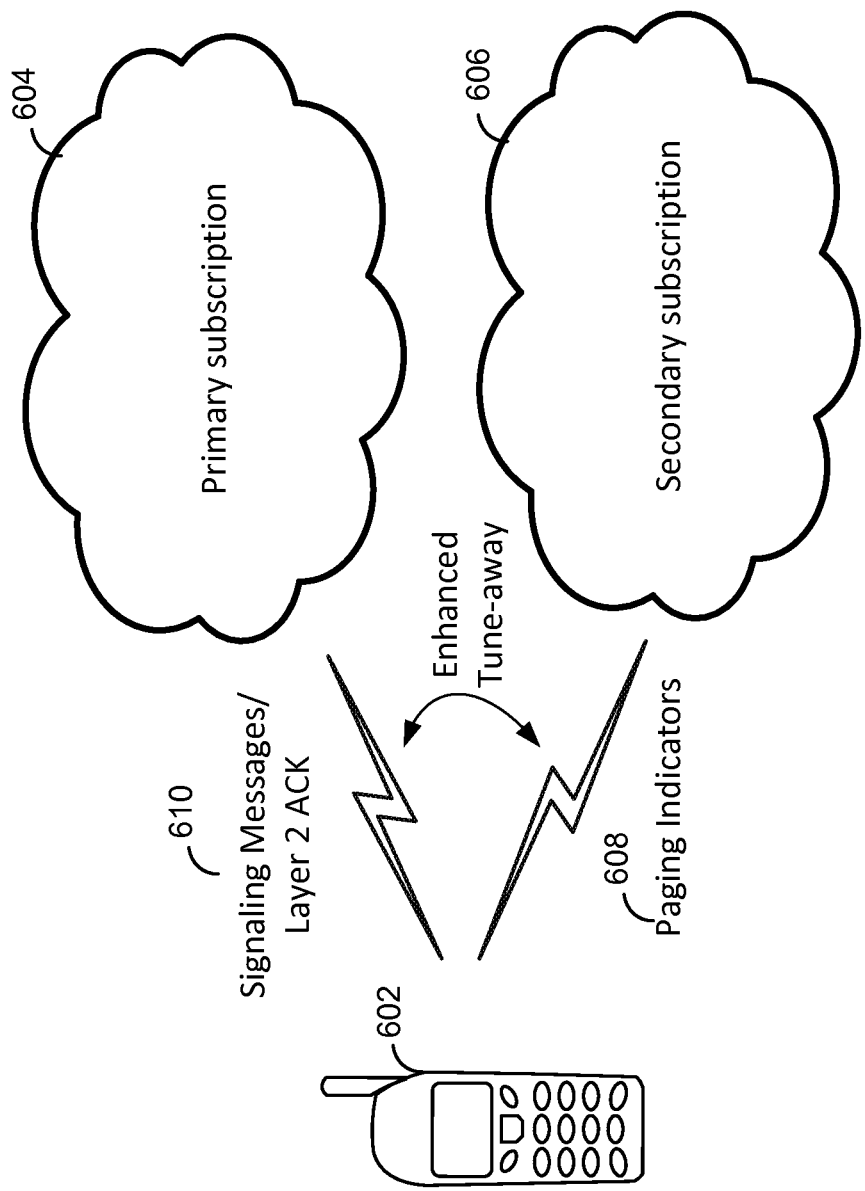
FIG. 6 is a conceptual diagram illustrating a user equipment configured to operate in a primary subscription and a secondary subscription according to some aspects of the disclosure.

FIG. 6 is a conceptual diagram illustrating a DSDS UE 602 configured to operate in a primary subscription 604 and a secondary subscription 606 according to some aspects of the disclosure. In an example, the UE 602 may be any of the UEs illustrated in FIGS. 1, 2, and 4, which may be implemented by the apparatus 500. In one aspect of the disclosure, the UE 602 may include a subscription manager 402 of FIG. 4 to manage multiple subscriptions. In an aspect of the disclosure, during a DSDS tuning away operation of the UE 602 with a single RF chain (transceiver), while being active on a primary subscription 604, see FIG. 6, the UE 602 may need to tune the RF chain to a secondary subscription 606 at certain occasions to be able to read the Paging Indicators (PIs) 608 for possible a Mobile Terminated (MT) Call with the secondary subscription 604. For example, the single RF chain may include a transceiver 510 of FIG. 5. This process of tuning away from the current primary subscription for reading the paging information on the secondary subscription is referred as DSDS tune-away or multi-SIM/multi-standby tune-away. Whenever a signaling procedure involving one or more signaling messages 610 is ongoing on the primary subscription 604, if the UE 602 goes through the tune-away process, it is possible that the UE 602 will miss the signaling messages or associated layer 2 acknowledgment (ACK) 610 for the signaling messages of the primary subscription 604. Any failure of the signaling message is not desirable from the performance standpoint of the primary subscription. Also, any failure of signaling procedures might result in an undesirable call drop for the primary subscription 604. A signaling procedure may refer to the exchange of network signaling messages between the UE and the network. For example, the signaling messages may include signaling radio bearer (SRB) data.

Figure 7:
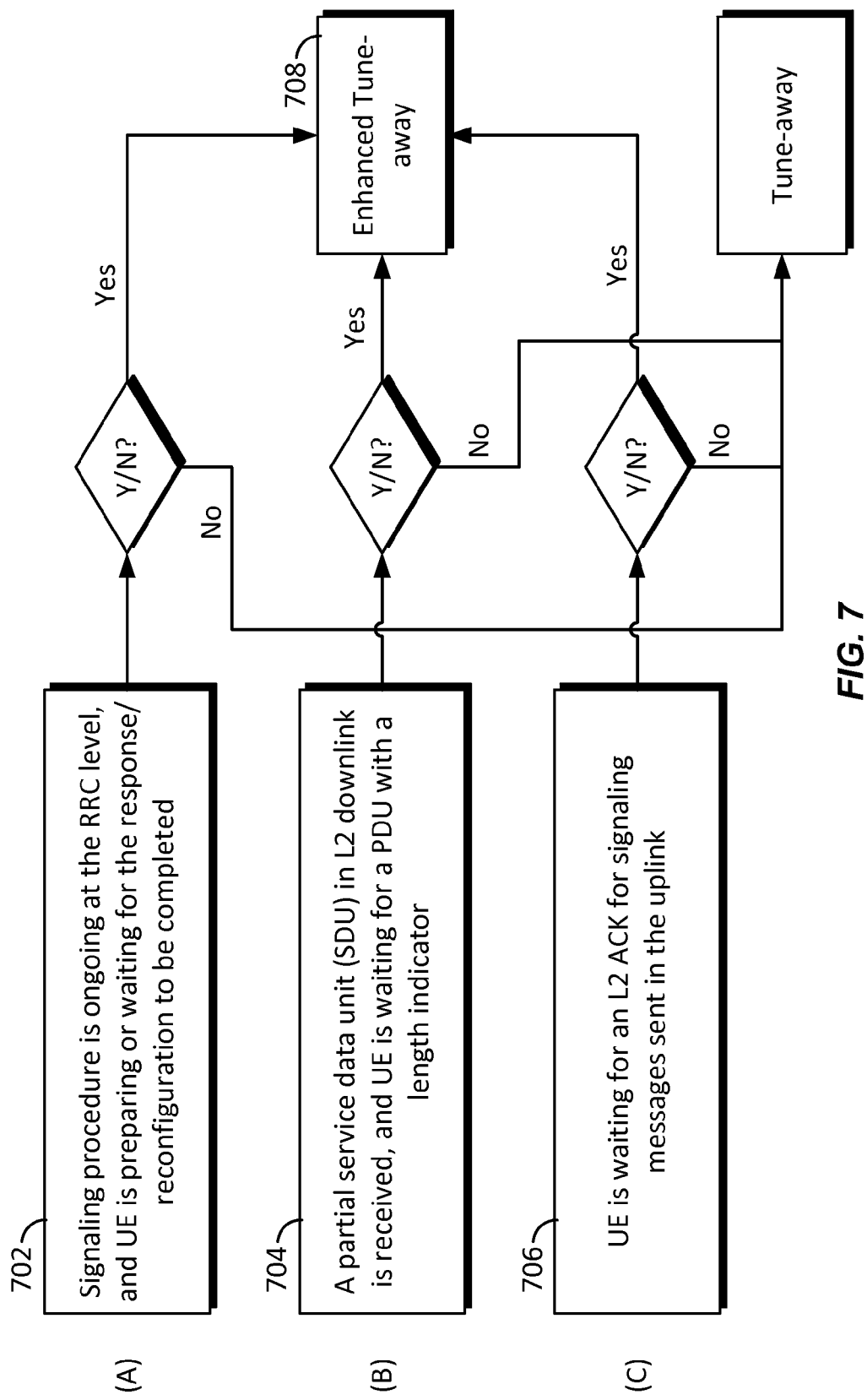
FIG. 7 is a diagram illustrating a number of scenarios in which a user equipment performs different tune-away procedures in accordance with aspects of the disclosure.

To avoid or reduce performance degradation of the signaling procedure of the primary subscription, in general, during a DSDS operation, the UE 602 should avoid relinquishing its shared RF resource so as to access (or tune away to) the secondary subscription in certain conditions. FIG. 7 is a diagram illustrating some scenarios in which the UE may perform different tune-away procedures in accordance with an aspect of the disclosure. Of course, these illustrated scenarios are merely exemplary in nature, and within the scope of the present disclosure, the "enhanced" tune-away procedures described in further detail below may be utilized not only in the illustrated scenarios, but in any suitable scenario.

At block 702 (Scenario A), a signaling procedure is ongoing at the RRC level. For example, the RRC entity 316 may be internally processing one or more received downlink messages, and the UE is preparing the response of the signaling procedure or waiting for the reconfiguration of the signaling procedure to be completed.

At block 704 (Scenario B), for the layer 2 downlink, an RLC entity 312 of the UE may have received a partial service data unit (SDU) and is waiting for the remaining SDU or a PDU with a length indicator (LI), which is used if concatenation of SDUs takes place in the RLC (L2) PDU.

At block 706 (Scenario C), for the L2 uplink, an RLC entity 312 of the UE may be waiting for an L2 ACK, for one or more signaling messages sent in the uplink.

If any of the scenarios A, B and C occurs, the UE may perform an enhanced tune-away procedure at block 708 to tune away to the secondary subscription under certain conditions. The enhanced tune-away procedure will be described in detail in relation to FIGS. 10 and 11 below. Otherwise, if none of the scenarios A, B and C exists, the UE may tune away to the second subscription at a suitable time or predetermined time.

In a UMTS network, the control signaling between a UE and UTRAN is generally conducted via RRC messages. RRC messages carry all parameters required to set up, modify and release layer 2 and layer 1 protocol entities. RRC messages also carry in their payload higher layer signaling (e.g., mobility management (MM), connection management (CM), session management (SM), etc.). The mobility of a UE in its connected mode is controlled by RRC signaling (measurements, handovers, cell updates, etc.).

Figure 8:
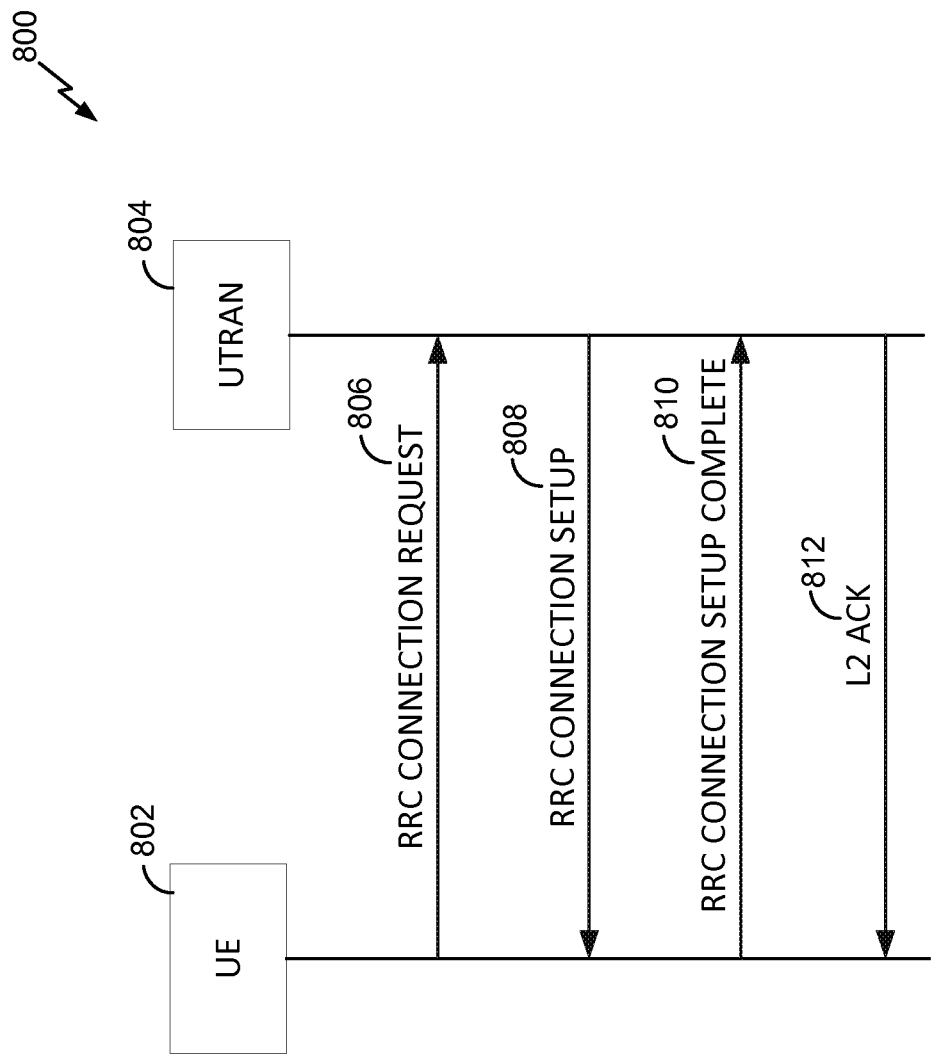
FIG. 8 is a message flow diagram illustrating a radio resource control (RRC) signaling procedure between a user equipment and a UTRAN.

FIG. 8 is a message flow diagram illustrating an RRC signaling procedure 800 between a UE 802 and UTRAN 804. In an aspect of the disclosure, the UE 802 may be the same as the UE 110, 400, 500, or 602, and the UTRAN 804 may be the same as the UTRAN 102. In general, RRC signaling procedures consist of signaling message request/setup/setup complete or reconfigure/reconfigure complete messages. Referring to FIG. 8, in a typical RRC connection establishment procedure, the UE 802 may transmit an RRC Connection Request message 806 to the UTRAN 804. For example, the UE may use a signaling protocol stack 406 and a communication interface 408 of FIG. 4 to transmit the RRC Connection Request message 806. The UTRAN 804 returns an RRC Connection Setup message 808 that contains configuration information for setting up a signaling radio bearer (SRB) (if the RRC connection cannot be established, the message sent is an RRC Connection Setup Reject message). For example, the UE may use the signaling protocol stack 406 and communication interface 408 to handle the RRC Connection Setup message 808. Then, the UE 802 transmits an RRC Connection Setup Complete message 810 that is used to confirm the successful completion of an RRC connection establishment. For example, the UE may use the signaling protocol stack 406 and communication interface 408 to send the RRC Connection Setup Complete message 810.

Until the layer 2 RLC ACK 812 is received by the signaling protocol stack 406 of the UE for the RRC Connection Setup Complete message 810, in some DSDS designs, the UE is generally not allowed to tune away to a secondary subscription. Because these RRC message exchange procedures can span over a few hundreds of milliseconds with the first subscription, the number of paging message misses might be undesirably high for the secondary subscription and might result in degraded mobile terminated (MT) call performance on the secondary subscription. Furthermore, for example in UMTS, some signaling procedures may not have very specific time requirements or limits; therefore, during heavy network loading conditions, the signaling procedure may take more time to complete, thus resulting in more MT call performance degradation.

Thus, various aspects of the present disclosure provide for an improved tune-away procedure that can enhance multi-SIM/multi-standby performance of a UE, for example, in the above-described scenarios (A)-(C) illustrated in FIG. 7, or in other examples, in other suitable scenarios. That is, in one or more aspects of the disclosure a UE may be adapted to perform two different activities concurrently (e.g., simultaneously), by temporarily tuning away from one activity to perform the other, before returning (tuning back) to the first activity. Aspects of the disclosure disclose a more optimal and efficient tuning-away scheme, such that the first activity, from which the UE tunes away, is not substantially compromised. One aspect of the tune-away procedures disclosed herein lies in how it enables the UE to use a shared communication resource (e.g., a communication interface 408 or transceiver 510) to access two or more subscriptions in an efficient way, providing improved multi-SIM/multi-standby (e.g., DSDS) performance. To provide a straightforward understanding of various aspects of the disclosure, examples are provided below. As described below, the UE may periodically tune away from a primary subscription and receive paging messages from a secondary subscription with the same transceiver without substantially affecting the communication with the primary subscription.

The L2 RLC layer 312 (see FIG. 3) offers services to higher layers via service access points (SAPs), which describe how the RLC layer 312 handles the data packets and if, for example, the automatic repeat request (ARQ) function is used. On the control plane, the RLC services are used by the RRC layer 316 for signaling transport. The RLC services are called signaling radio bearers (SRBs) in the control plane. In some examples, SRB configurations use a 40 milliseconds (ms) transmission time interval (TTI) on the Dedicated Physical Channel (DPCH) (see FIG. 9), which applies time multiplexing for physical control information and user data transmission.

Figure 9:
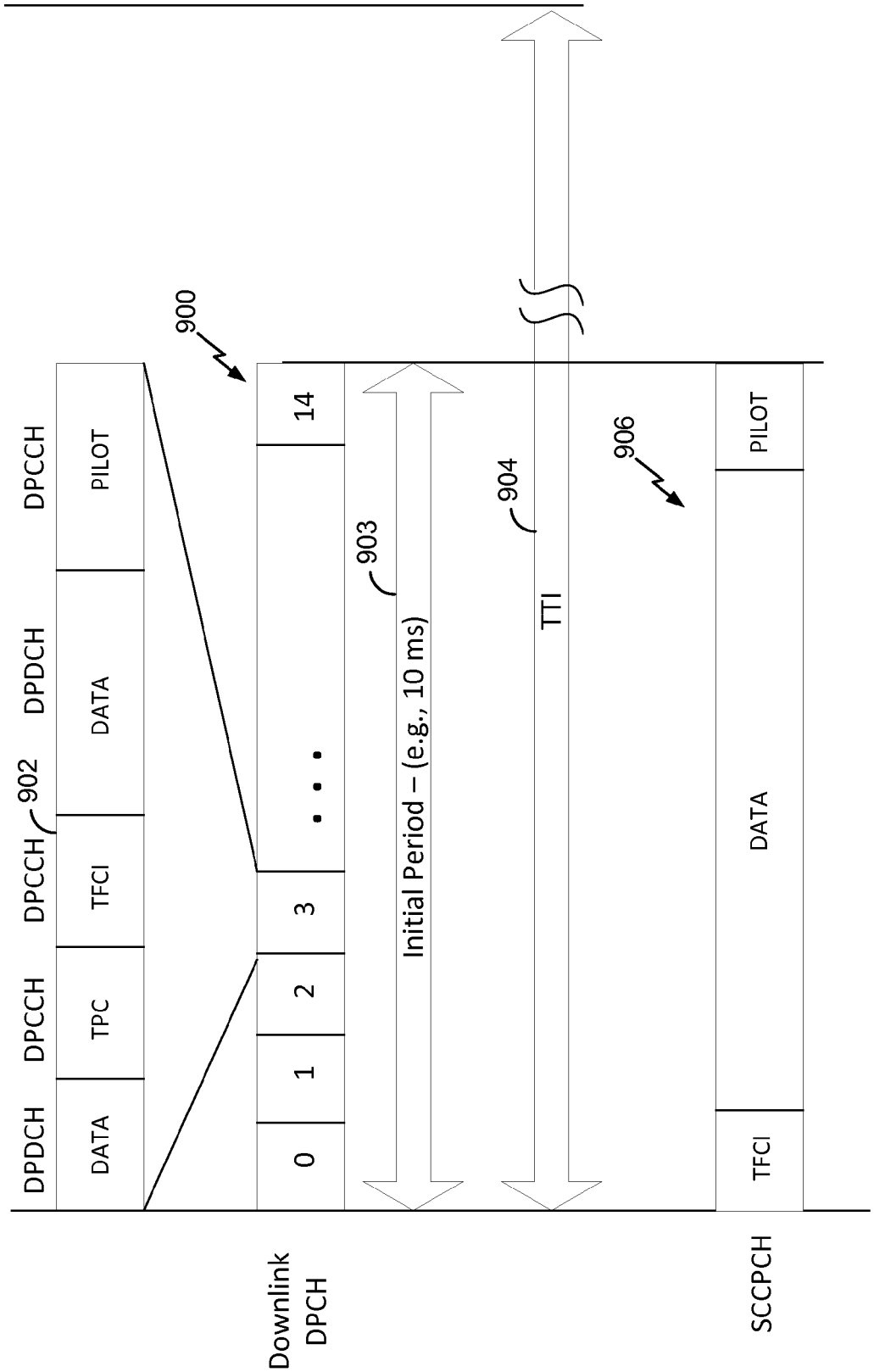
FIG. 9 is a conceptual diagram illustrating a dedicated physical control channel (DPCCH) and a dedicated physical data channel (DPDCH) time-multiplexed on a downlink dedicated physical channel (DPCH).

FIG. 9 is a conceptual diagram illustrating a dedicated physical control channel (DPCCH) and a dedicated physical data channel (DPDCH) time-multiplexed on a downlink DPCH 900. In the DPCCH, the transport format combination indicator (TFCI) information 902 is transmitted every 10 ms during the initial period 903 of the TTI. The initial period of the TTI may refer to the beginning portion or period of the TTI. The TFCI information 902 is transmitted in the physical control channel to inform the receiver (e.g., UE 602) which transport channels are active for the current frame or TTI. Therefore, by decoding the DPCCH during the initial period (e.g., first 10 ms) of the 40 ms SRB TTI, the UE can determine whether or not SRB data is present for the UE in the current TTI 904. If the decoded date of the first 10 ms (i.e., TFCI) of the SRB TTI indicates no SRB data in the current frame, there will not be any data in the next 30 ms as per protocol in UMTS. Therefore, in an aspect of the present disclosure, a UE may utilize this knowledge in an improved tune-away scheme.

In another aspect of the disclosure, the UE may monitor a secondary common control physical channel (SCCPCH) 906 during the initial period 903. By decoding, for example, the TFCI of the SCCPCH 906 during the initial period 903 of the TTI, the UE can determine whether or not SRB data is present for the UE in the current TTI.

Figure 10:
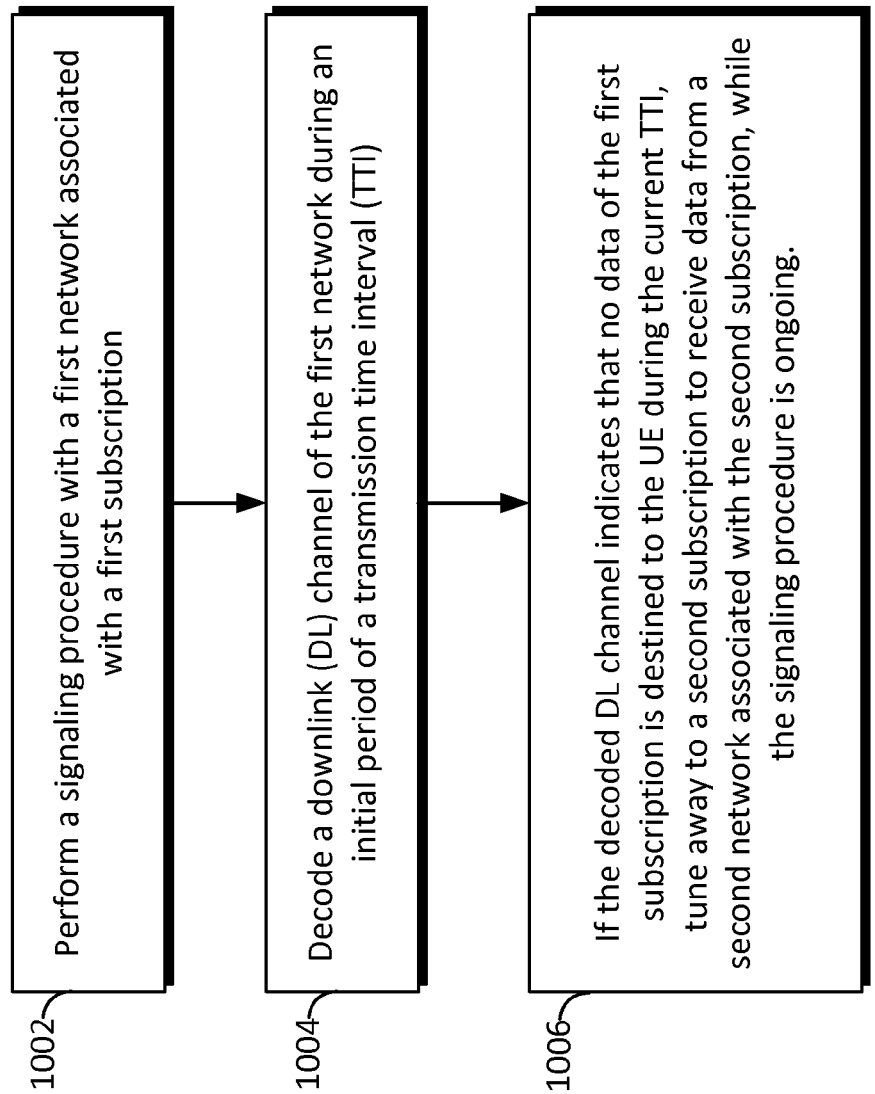
FIG. 10 is a flow chart illustrating a method of wireless communication operable at a multi-SIM/multi-standby UE configured to communicate with a first subscription and a second subscription in accordance with an aspect of the disclosure.

FIG. 10 is a flow chart illustrating a tune-away method 1000 of wireless communication operable at a multi-SIM UE configured to communicate with a first subscription and a second subscription in accordance with an aspect of the disclosure. In some examples, the method 1000 may be performed by any of the UEs illustrated in FIGS. 1, 2, 4, 5, 6, and/or 8. In some aspects of the disclosure, the method 1000 may be implemented as the enhanced tune-away procedure at block 708 of FIG. 7. At block 1002, a UE performs a signaling procedure with a first network associated with a first subscription. For example, the signaling procedure may be performed by a subscription manager 402 according to a signaling protocol stack of FIG. 4. In an aspect of the disclosure, the first subscription may be the primary subscription 604 of FIG. 6, and the signaling procedure involves signaling messages/layer 2 ACK 610. In another example, the signaling procedure may be an RRC signaling procedure 800 as illustrated in FIG. 8. At block 1004, the UE decodes a downlink (DL) channel of the first network during an initial period of a transmission time interval (TTI). For example, the UE may utilize a channel decoder 404 of FIG. 4 to decode the DPCCH during the first 10 ms of the TTI 904 as illustrated in FIG. 9. At block 1006, if the decoded portion (e.g., TFCI information) of the DL channel indicates that no data of the first subscription is destined to the UE during the current TTI, the UE may tune away to a second subscription to receive data from a second network associated with the second subscription, while the signaling procedure is ongoing. When the DL channel has no data destined to the UE, the DL channel carries no data specifically targeted to only the UE during the TTI. In an aspect of the disclosure, the second subscription may be the secondary subscription 606 of FIG. 6, and the UE may utilize a subscription manager 402 of FIG. 4 to tune away to the secondary subscription 606 to receive paging indicators 608.

Figure 11:
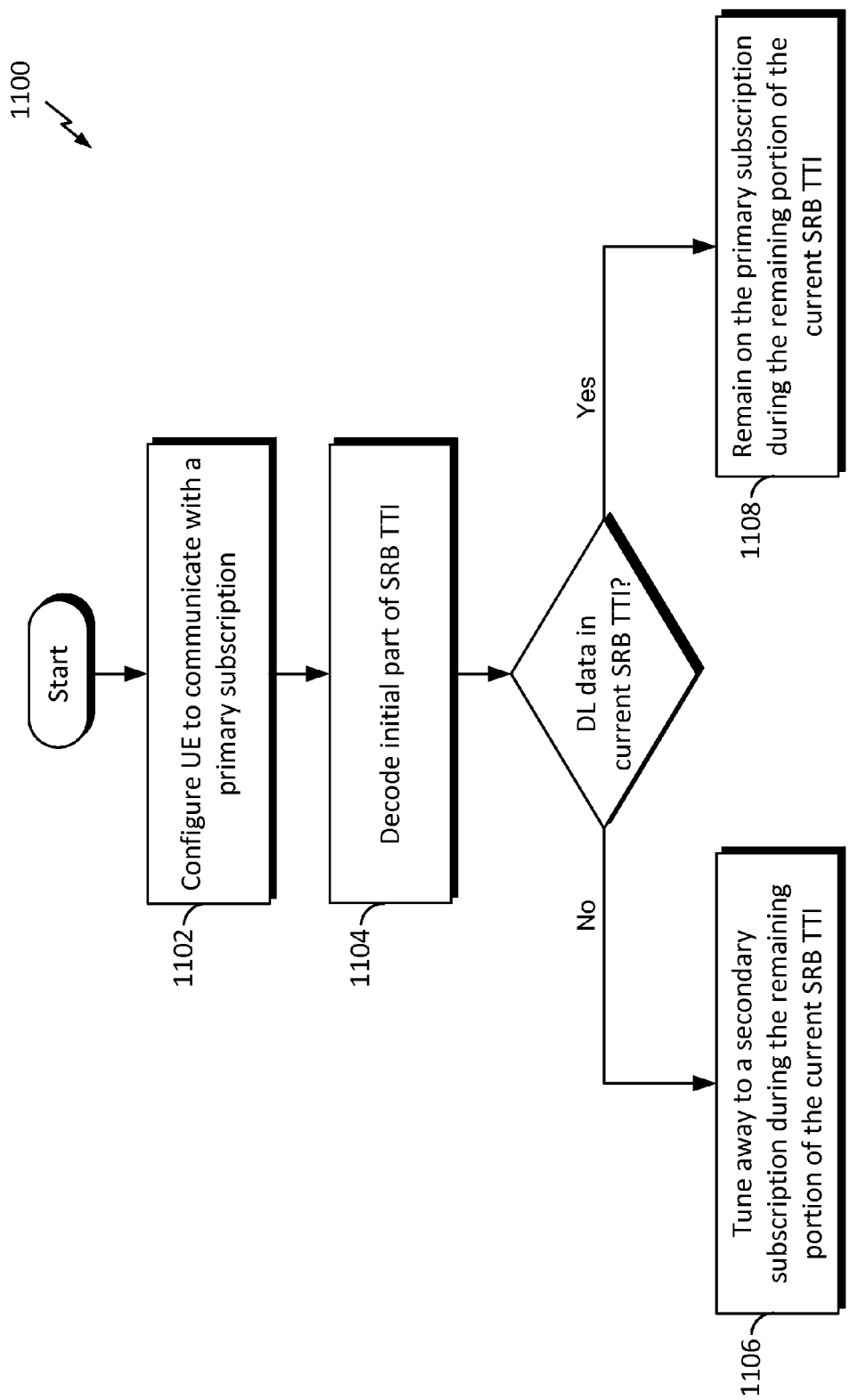
FIG. 11 is a flow chart illustrating a multi-SIM/multi-standby tune-away procedure in accordance with an aspect of the disclosure.

FIG. 11 is a flow chart illustrating a multi-SIM/multi-standby tune-away procedure 1100 in accordance with an aspect of the disclosure. The procedure 1100 may be performed at a DSDS UE that may be configured to communicate with a primary subscription or a secondary subscription. In various examples, the UE may be any of the UEs illustrated in FIGS. 1, 2, 4, 5, 6, and/or 8. In one aspect of the disclosure, the procedure 1100 may be implemented as the enhanced tune-away in block 708 of FIG. 7. At block 1102, the UE is configured to communicate with a primary subscription. For example, the UE may utilize a subscription manager 402 of FIG. 4 to manage the communication with a primary subscription 604 of FIG. 6. During this time, the UE may start or have an ongoing signaling procedure with the primary subscription (e.g., see block 1002). For example, the signaling procedure may be an RRC connection establishment procedure with a UTRAN of the primary subscription similar to those described above in relation to FIGS. 7 and 8.

At block 1104, the UE decodes an initial part (or initial period) of a downlink channel of the primary subscription. For example, the UE may utilize a channel decoder 404 of FIG. 4 to decode the downlink channel. In an aspect of the disclosure, the initial part may be the first 10 ms of an SRB TTI. In various examples, the TTI may be a 10 ms, 20 ms, 40 ms, or 80 ms TTI. In an aspect of the disclosure, the UE can decode the TFCI information (e.g., TFCI 902 of FIG. 9) on a DPCCH or a SCCPCH during the first 10 ms of the SRB TTI. If the decoded information indicates that no downlink data is destined or scheduled for the UE in the current SRB TTI, the procedure 1100 proceeds to block 1106; otherwise, the procedure 1100 proceeds to block 1108. At block 1106, the UE is configured to tune away to the secondary subscription during the remaining portion of the current SRB TTI. For example, for a 40 ms TTI, the UE may tune away during the last 30 ms of the TTI. In one aspect of the disclosure, the UE may utilize a subscription manager 402 of FIG. 4 to control the tune-away operation. At block 1106, for example, the UE may tune away even though it may be waiting for a layer 2 RLC ACK for the signaling message sent in the uplink, or a remaining SDU or PDU with a length indicator.

On the contrary, at block 1108, the UE is configured to remain on the primary subscription for the remaining portion of the current SRB TTI to receive DL data destined to the UE on the primary subscription. For example, the subscription manager 402 of the UE may determine to remain on the primary subscription. The tune-away procedure 1100 provides the UE with more opportunity to tune away to receive paging messages from the secondary subscription, while the primary subscription is going through the signaling procedure. Therefore, MT call performance on the secondary subscription may be improved without substantially affecting the primary subscription.

Several aspects of a telecommunications system have been presented with reference to a UMTS system. As those skilled in the art will readily appreciate, various aspects described throughout this disclosure may be extended to other telecommunication systems, network architectures and communication standards.

By way of example, various aspects may be extended to systems employing UMTS (FDD, TDD), Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE) configured to communicate with a first subscription and a second subscription, comprising:
    performing a signaling procedure with a first network associated with the first subscription;
    decoding a downlink channel of the first network during an initial period of a transmission time interval (TTI); and
    if the decoded downlink channel indicates that no data of the first subscription is destined to the UE during the TTI, tuning away to the second subscription to receive data from a second network associated with the second subscription, during a remaining portion of the TTI.

2. The method of claim 1, wherein the downlink channel comprises a dedicated physical control channel (DPCCH) or a secondary common control physical channel (SCCPCH).

3. The method of claim 1, wherein performing the signaling procedure comprises performing a radio resource control (RRC) signaling procedure.

4. The method of claim 1, wherein data transmitted on the downlink channel comprises transport format combination indicator (TFCI) information during the initial period of the TTI.

5. The method of claim 1, wherein decoding the downlink channel comprises decoding transport format combination indicator (TFCI) information from the downlink channel.

6. The method of claim 1, wherein tuning away comprises tuning away to the second subscription while the UE is waiting for a layer 2 acknowledgment (ACK) for an uplink signaling message for the first subscription.

7. The method of claim 1, wherein tuning away comprises tuning away to the second subscription while the UE is waiting for a remaining service data unit (SDU) or protocol data unit (PDU) with a length indicator for the first subscription.

8. The method of claim 1, wherein tuning away comprises tuning away to the second subscription while the UE is, at least one of:
    preparing a response of the signaling procedure; or
    waiting for reconfiguration of the signaling procedure to be completed.

9. A user equipment (UE) configured to communicate with a first subscription and a second subscription, comprising:
    means for performing a signaling procedure with a first network associated with the first subscription;
    means for decoding a downlink channel of the first network during an initial period of a transmission time interval (TTI); and
    means for, if the decoded downlink channel indicates that no data of the first subscription is destined to the UE during the TTI, tuning away to the second subscription to receive data from a second network associated with the second subscription, during a remaining portion of the TTI.

10. The UE of claim 9, wherein the downlink channel comprises a dedicated physical control channel (DPCCH) or a secondary common control physical channel (SCCPCH).

11. The UE of claim 9, wherein the means for performing the signaling procedure is configured to perform a radio resource control (RRC) signaling procedure.

12. The UE of claim 9, wherein data transmitted on the downlink channel comprises transport format combination indicator (TFCI) information during the initial period of the TTI.

13. The UE of claim 9, wherein the means for decoding the downlink channel is configured to decode transport format combination indicator (TFCI) information from the downlink channel.

14. The UE of claim 9, wherein the means for tuning away is configured to tune away to the second subscription while the UE is waiting for a layer 2 acknowledgment (ACK) for an uplink signaling message for the first subscription.

15. The UE of claim 9, wherein the means for tuning away is configured to tune away to the second subscription while the UE is waiting for a remaining service data unit (SDU) or protocol data unit (PDU) with a length indicator for the first subscription.

16. A non-transitory computer-readable medium comprising code configured to cause a user equipment (UE) to:
    perform a signaling procedure with a first network associated with a first subscription;
    decode a downlink channel of the first network during an initial period of a transmission time interval (TTI); and
    if the decoded downlink channel indicates that no data of the first subscription is destined to the UE during the TTI, tune away to a second subscription to receive data from a second network associated with the second subscription, during a remaining portion of the TTI.

17. The non-transitory computer-readable medium of claim 16, wherein the downlink channel comprises a dedicated physical control channel (DPCCH) or a secondary common control physical channel (SCCPCH).

18. The non-transitory computer-readable medium of claim 16, wherein for the signaling procedure, the code is configured to cause the UE to perform a radio resource control (RRC) signaling procedure.

19. The non-transitory computer-readable medium of claim 16, wherein data transmitted on the downlink channel comprises transport format combination indicator (TFCI) information during the initial period of the TTI.

20. The non-transitory computer-readable medium of claim 16, wherein for decoding the downlink channel, the code is configured to cause the UE to decode transport format combination indicator (TFCI) information from the downlink channel.

21. The non-transitory computer-readable medium of claim 16, wherein for tuning away, the code is configured to cause the UE to tune away to the second subscription while the UE is waiting for a layer 2 acknowledgment (ACK) for an uplink signaling message for the first subscription.

22. The non-transitory computer-readable medium of claim 16, wherein for tuning away, the code is configured to cause the UE to tune away to the second subscription while the UE is waiting for a remaining service data unit (SDU) or protocol data unit (PDU) with a length indicator for the first subscription.

23. A user equipment (UE) comprising:
    at least one processor;
    a communication interface coupled to the at least one processor; and
    a memory coupled to the at least one processor,
    wherein the at least one processor comprises:
        a first component configured to perform a signaling procedure with a first network associated with a first subscription;

a second component configured to decode a downlink channel of the first network during an initial period of a transmission time interval (TTI); and a third component configured to if the decoded downlink channel indicates that no data of the first subscription is destined to the UE during the TTI, tune away to a second subscription to receive data from a second network associated with the second subscription, during a remaining portion of the TTI.

24. The UE of claim 23, wherein the downlink channel comprises a dedicated physical control channel (DPCCH) or a secondary common control physical channel (SCCPCH).

25. The UE of claim 23, wherein for the signaling procedure, the first component is further configured to perform a radio resource control (RRC) signaling procedure.

26. The UE of claim 23, wherein data transmitted on the downlink channel comprises transport format combination indicator (TFCI) information during the initial period of the TTI.

27. The UE of claim 23, wherein for decoding the downlink channel, the second component is further configured to decode transport format combination indicator (TFCI) information from the downlink channel.

28. The UE of claim 23, wherein for tuning away, the third component is further configured to tune away to the second subscription while the UE is waiting for a layer 2 acknowledgment (ACK) for an uplink signaling message for the first subscription.

29. The UE of claim 23, wherein for tuning away, the third component is further configured to tune away to the second subscription while the UE is waiting for a remaining service data unit (SDU) or protocol data unit (PDU) with a length indicator for the first subscription.

30. The UE of claim 23, wherein for tuning away, the third component is further configured to tune away to the second subscription while the UE is, at least one of:

preparing a response of the signaling procedure; or waiting for reconfiguration of the signaling procedure to be completed.

* * * * *